United States Patent
Pagliano

(10) Patent No.: US 10,832,357 B1
(45) Date of Patent: Nov. 10, 2020

(54) REAL ESTATE TRANSACTION FACILITATING PROCESS AND INCOMING PROPERTY OFFER NOTIFICATION SYSTEM

(71) Applicant: Jamie Michele Pagliano, Rolling Hills Estates, CA (US)

(72) Inventor: Jamie Michele Pagliano, Rolling Hills Estates, CA (US)

( * ) Notice: Subject to any disclaimer, the term of this patent is extended or adjusted under 35 U.S.C. 154(b) by 196 days.

(21) Appl. No.: 15/864,956

(22) Filed: Jan. 8, 2018

Related U.S. Application Data

(60) Provisional application No. 62/479,164, filed on Mar. 30, 2017.

(51) Int. Cl.
*G06Q 30/00* (2012.01)
*G06Q 50/16* (2012.01)
*G06Q 30/06* (2012.01)

(52) U.S. Cl.
CPC ......... *G06Q 50/16* (2013.01); *G06Q 30/0611* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 2005/0288958 A1* | 12/2005 | Eraker | G06Q 30/00 705/316 |
| 2007/0043770 A1* | 2/2007 | Goodrich | G06Q 30/00 |
| 2013/0339189 A1* | 12/2013 | Minerick | G06Q 30/0613 705/26.41 |
| 2014/0279176 A1* | 9/2014 | Taylor | G06Q 50/16 705/26.4 |
| 2016/0203535 A1* | 7/2016 | Nguyen | G06Q 30/0609 705/26.35 |
| 2017/0280292 A1* | 9/2017 | Prapas | H04W 4/023 |
| 2017/0337647 A1* | 11/2017 | Vaynshteyn | G06Q 50/18 |
| 2018/0053269 A1* | 2/2018 | Heatherly | G06Q 30/0619 |

* cited by examiner

Primary Examiner — Mila Airapetian
(74) Attorney, Agent, or Firm — Plager Schack LLP; Mark H. Plager; Stephen Hallberg

(57) ABSTRACT

A real estate transaction facilitating process and system that allows buyers, sellers, and agents to be notified of any incoming offers on a property is disclosed. The real estate transaction facilitating process and system allows buyers, sellers, and agents to see how many offers there are on a property. Sellers have access to all the offers that come in which eliminates a distrustful agent who may hide an offer. Buyers are assured the seller has seen their offer. Agents have all offers in one location so none can be misplaced.

9 Claims, 6 Drawing Sheets

REAL ESTATE TRANSACTION FACILITATING PROCESS AND INCOMING PROPERTY OFFER NOTIFICATION SYSTEM

CLAIM OF BENEFIT TO PRIOR APPLICATION

This application claims benefit to U.S. Provisional Patent Application 62/479,164, entitled "REAL ESTATE TRANSACTION FACILITATING PROCESS AND INCOMING PROPERTY OFFER NOTIFICATION SYSTEM," filed Mar. 30, 2017. The U.S. Provisional Patent Application 62/479,164 is incorporated herein by reference.

BACKGROUND

Embodiments of the invention described in this specification relate generally to real estate systems, and more particularly, to a real estate transaction facilitating process and an incoming property offer notification system that allows real estate buyers, sellers, and agents to be notified of any incoming offers on a property.

The real estate industry has a problem with transparency when it comes to buying or selling property. Broadly speaking, there is no transparency in the real estate industry. Listing agents sometimes double end deals and will not show a higher price offer or offer with better terms to guarantee both sides of the transaction for themselves.

Therefore, what is needed is a way to solve the transparency problem within the real estate industry by allowing buyers, sellers and agents to see how many offers there are on a property. Sellers have access to all the offers that come in which eliminates a distrustful agent who may hide an offer. Buyers are assured the seller has seen their offer. Agents have all offers in one location so none can be misplaced.

BRIEF DESCRIPTION

Some embodiments of the invention include a novel real estate transaction facilitating process and a novel incoming property offer notification system that allows real estate buyers, sellers, and agents to be notified of any incoming offers on a property. In some embodiments, the real estate transaction facilitating process includes several steps comprising a step for establishing a website by a property buyer, a property seller, and one or more property agents, a step for setting up a property on the website, a step for determining whether to visually output an offer price for the property contingent upon permission from the property seller, a step for searching for listed properties and saving any property the buyer or an agent wants to watch, a step for sending a text message (SMS) and an email notification when an offer has been submitted on a property of their choice, a step for visually outputting all offers on a portal and instantly notifying a seller when an offer has been submitted, and a step for submitting offers online through the site and being notified that offer file submissions have been uploaded.

In some embodiments, a listing agent sets up the property on the website. In some embodiments, the listing agent requests permission from the property seller to show the offer price. In some embodiments, buyers and agents receive the text message (SMS) and the email notification when an offer has been submitted on a property of their choice. In some embodiments, the real estate seller is an independent real estate seller who is not represented by a real estate agent. In some embodiments, the independent real estate seller has the option of posting their home property for sale by owner on the website.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
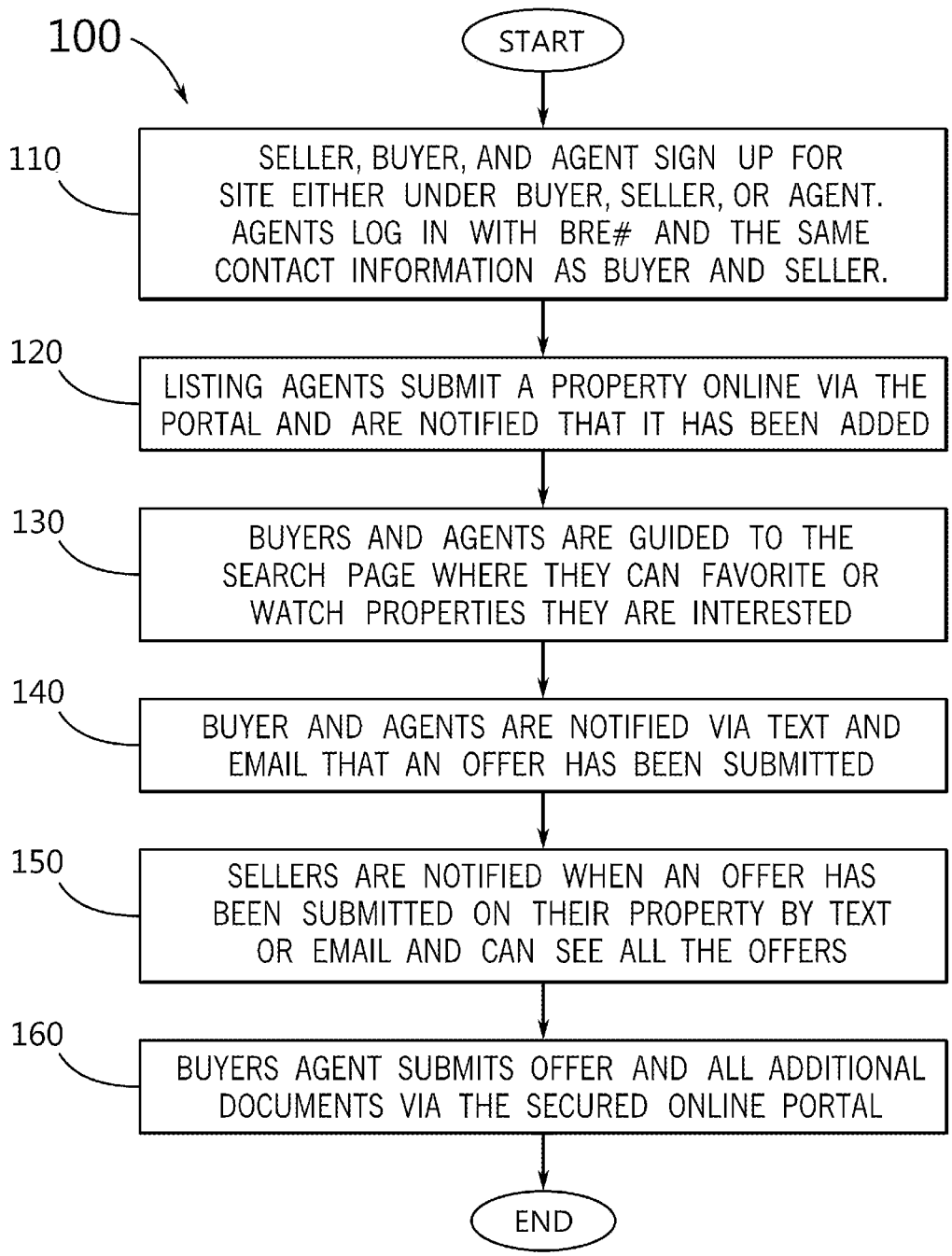

Having thus described the invention in general terms, reference is now made to the accompanying drawings, which are not necessarily drawn to scale, and which show different views of different example embodiments, and wherein:

FIG. 1 conceptually illustrates a real estate transaction facilitating process in some embodiments.

Figures 2, 3:
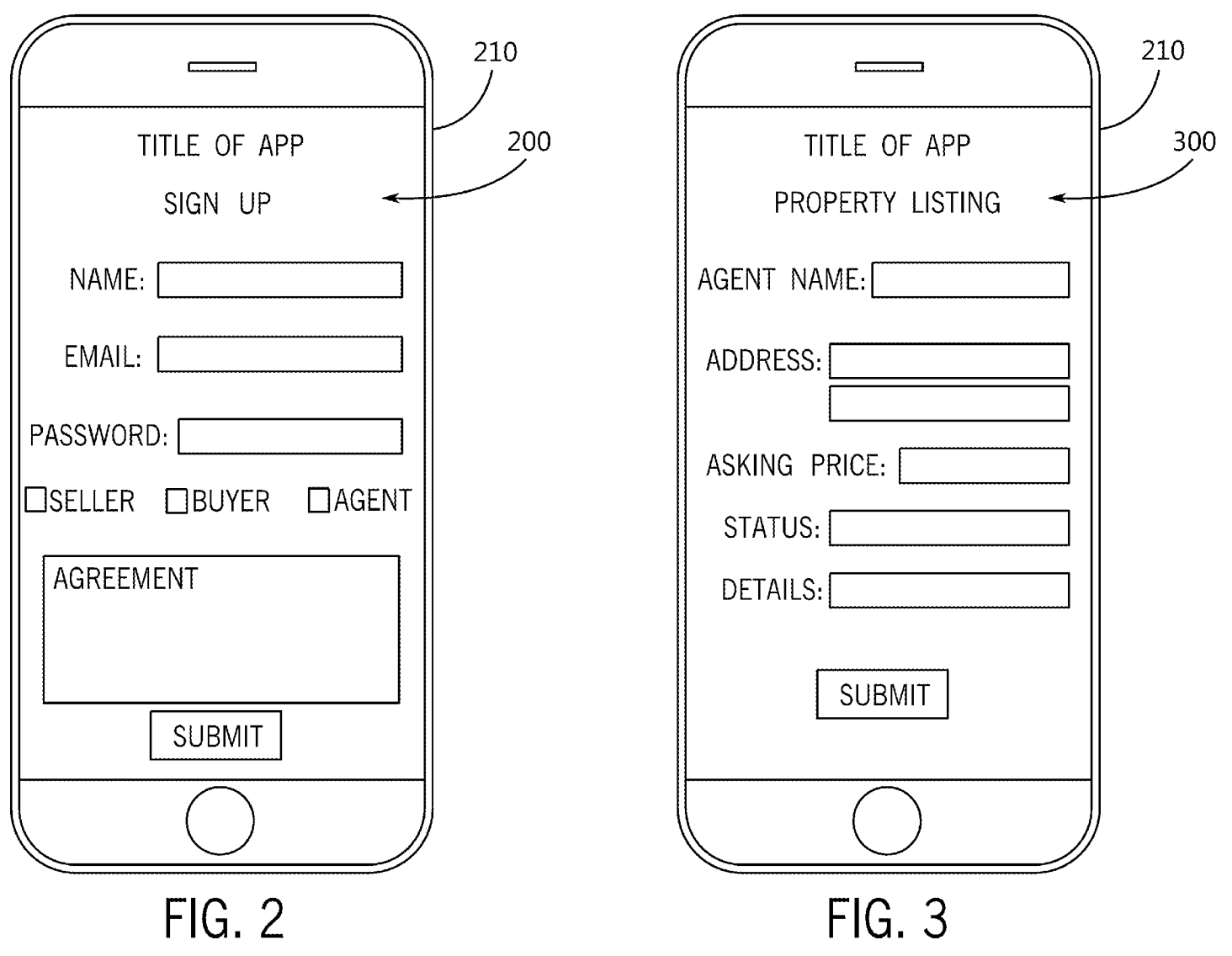

FIG. 2 conceptually illustrates an example of registration view of a graphical user interface (GUI) of a real estate transaction facilitating software application that implements the real estate transaction facilitating process on a digital device in some embodiments.

FIG. 3 conceptually illustrates an example of a property listing view of the GUI of the real estate transaction facilitating software application in some embodiments.

Figure 4:
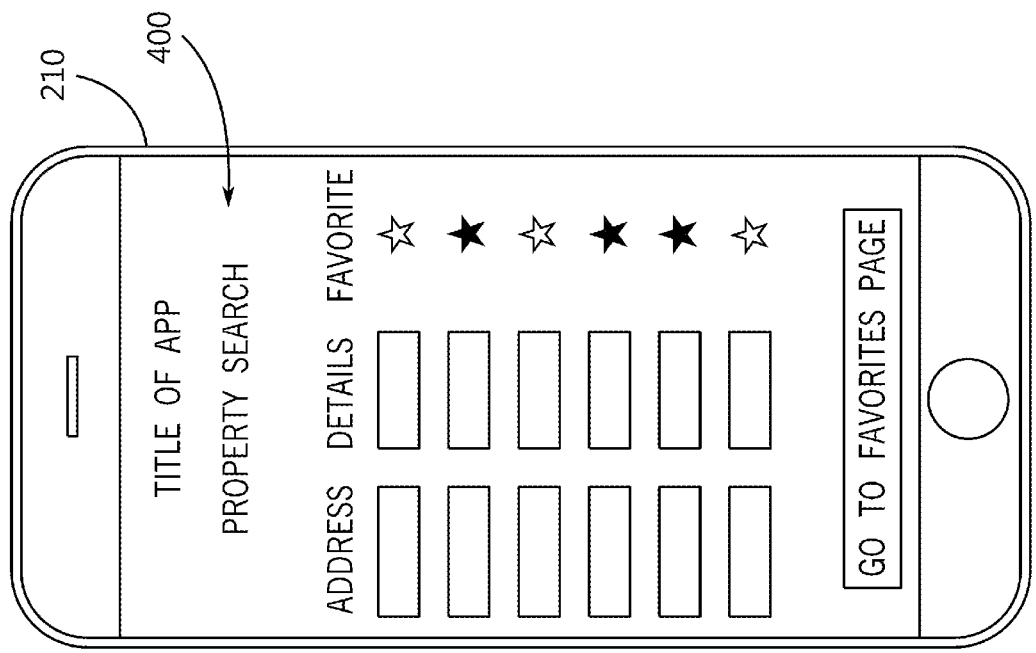

FIG. 4 conceptually illustrates an example of a property search view of the GUI of the real estate transaction facilitating software application in some embodiments.

Figure 5:
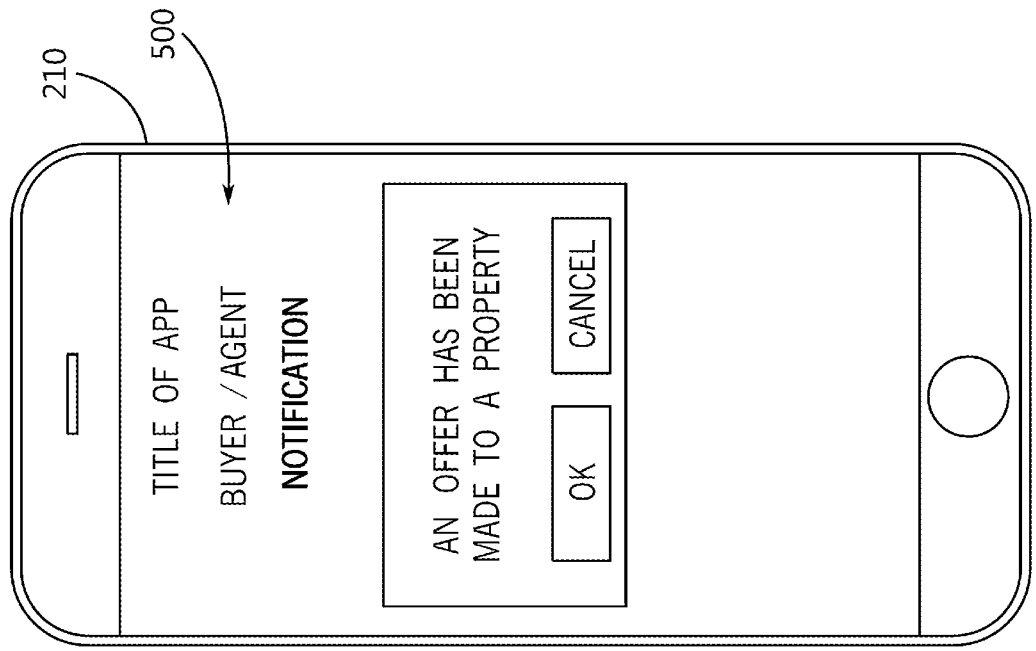

FIG. 5 conceptually illustrates an example of a buyer/agent notification view of the GUI of the real estate transaction facilitating software application in some embodiments.

Figure 6:
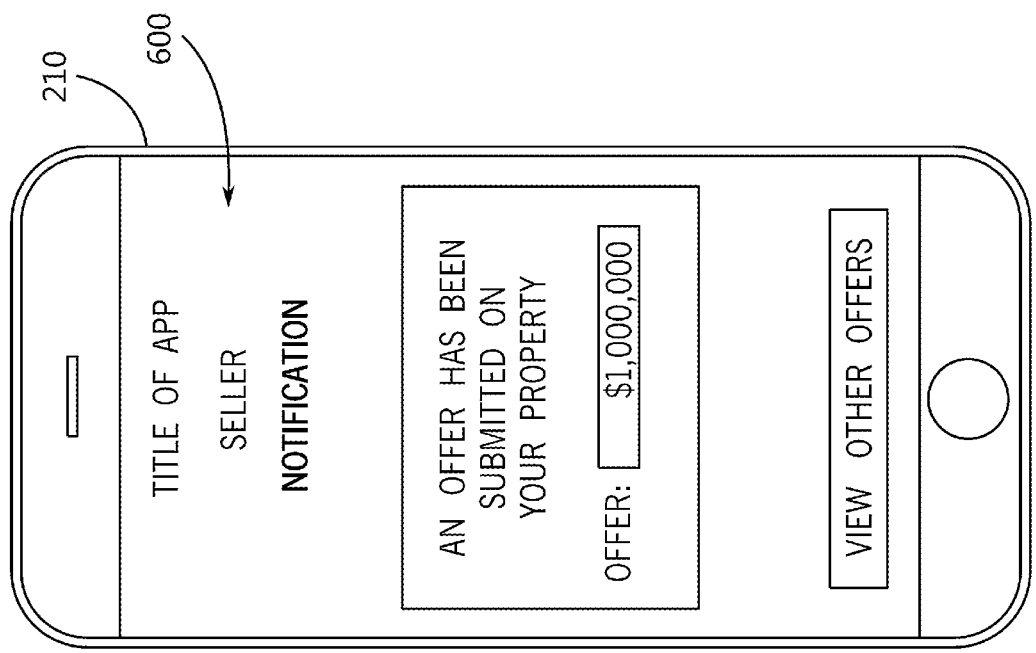

FIG. 6 conceptually illustrates an example of a seller notification view of the GUI of the real estate transaction facilitating software application in some embodiments.

Figure 7:
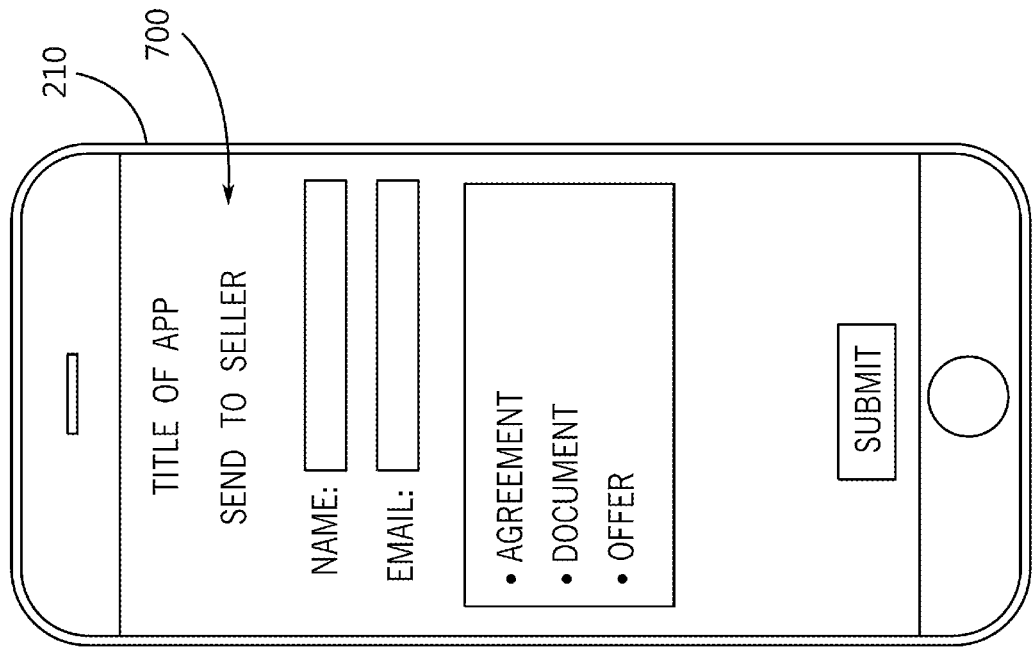

FIG. 7 conceptually illustrates an example of an offer submission view of the GUI of the real estate transaction facilitating software application in some embodiments.

Figure 8:
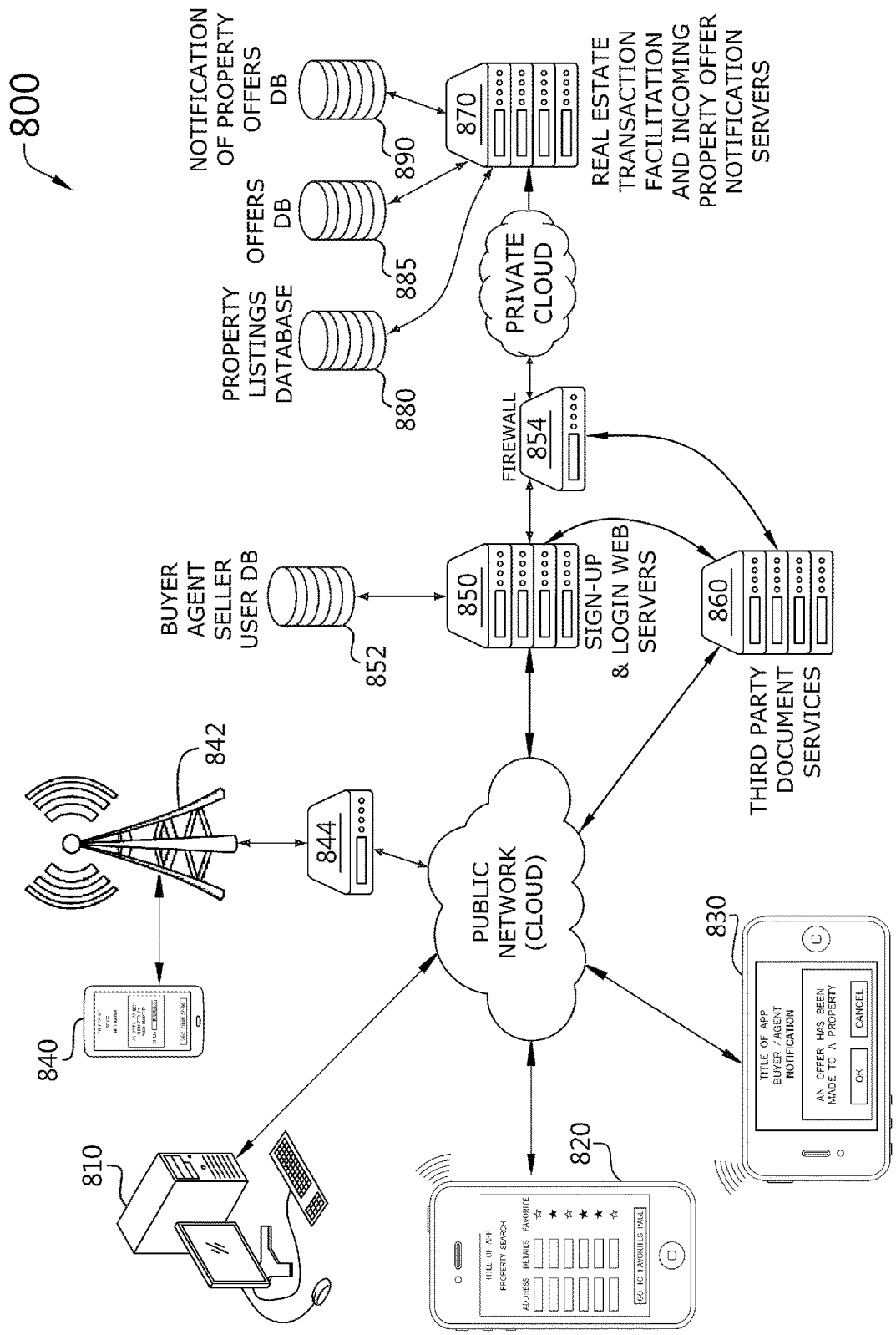

FIG. 8 conceptually illustrates a network architecture of a cloud-based real estate transaction facilitation and incoming property offer notification system in some embodiments.

Figure 9:
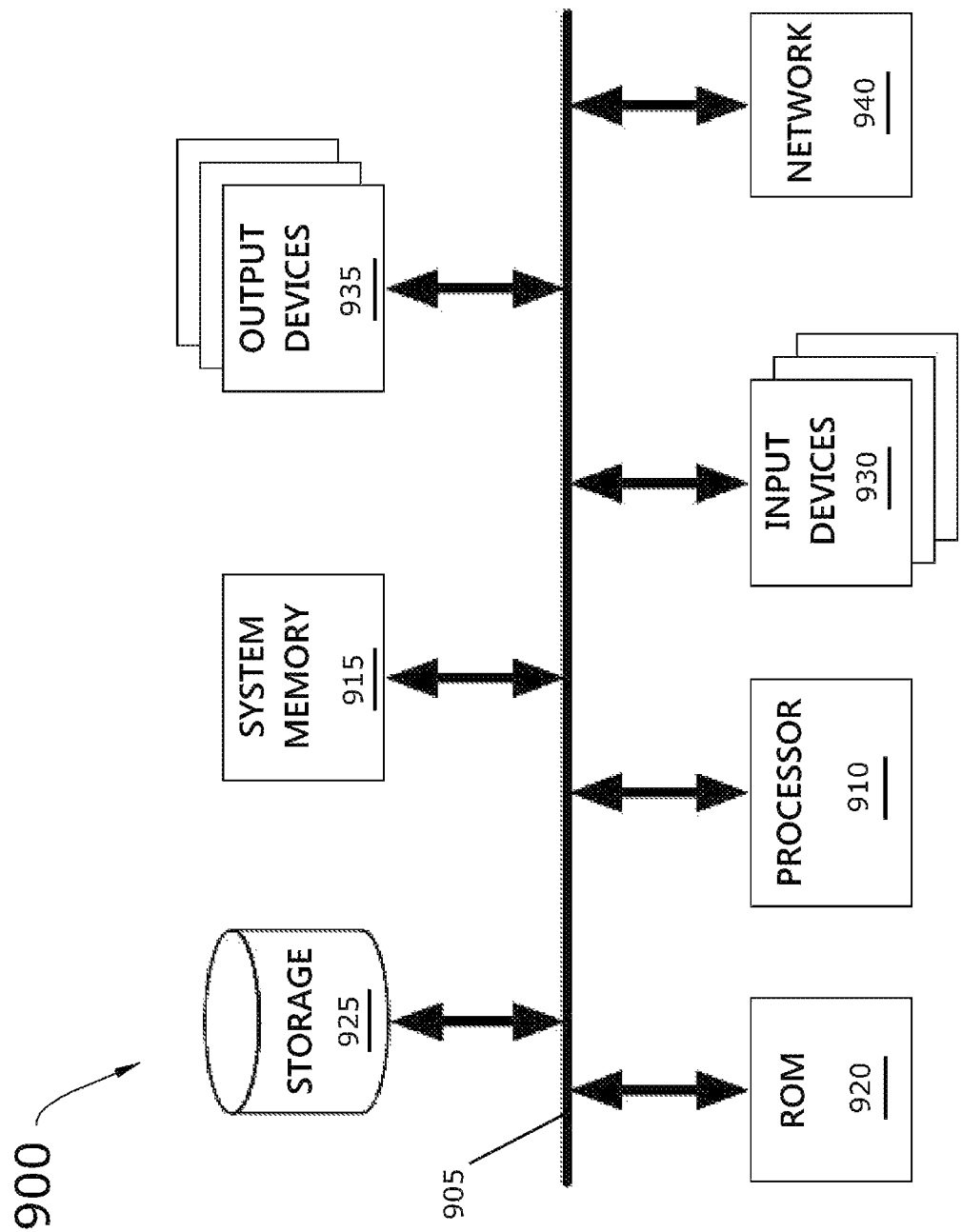

FIG. 9 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

As stated above, the real estate industry has a problem with transparency when it comes to buying or selling property. Embodiments of the real estate transaction facilitating process and system described in this specification solves several ongoing problems in the industry, including the problem of agents hiding offers from the sellers, the problem of buyers not knowing if the sellers have seen their offer, the problem of buyers not trusting listing agents, the problem of distrust of listing agents, and the problem of buyers not being able to compete for a property.

Some embodiments of the invention include a novel real estate transaction facilitating process and a novel incoming property offer notification system that allows real estate buyers, sellers, and agents to be notified of any incoming offers on a property. In some embodiments, the real estate transaction facilitating process includes several steps comprising a step for establishing a website by a property buyer, a property seller, and one or more property agents, a step for setting up a property on the website, a step for determining whether to visually output an offer price for the property contingent upon permission from the property seller, a step for searching for listed properties and saving any property the buyer or an agent wants to watch, a step for sending a text message (SMS) and an email notification when an offer has been submitted on a property of their choice, a step for visually outputting all offers on a portal and instantly notifying a seller when an offer has been submitted, and a step for submitting offers online through the site and being notified that offer file submissions have been uploaded.

In some embodiments, a listing agent sets up the property on the website. In some embodiments, the listing agent requests permission from the property seller to show the offer price. In some embodiments, buyers and agents receive the text message (SMS) and the email notification when an offer has been submitted on a property of their choice. In some embodiments, the real estate seller is an independent real estate seller who is not represented by a real estate agent. In some embodiments, the independent real estate seller has the option of posting their home property for sale by owner on the website.

In this specification, there are descriptions of methods and processes that are implemented as software applications or computer programs which run on computing devices to perform the steps of the real estate transaction facilitating method and/or process or the steps of methods and/or processes performed by the incoming property offer notification system. However, it should be noted that for the purposes of the embodiments described in this specification, the word "method" is used interchangeably with the word "process". Real estate transaction facilitating processes or methods are described, therefore, by reference to example methods that conceptually illustrate steps of real estate transaction facilitating processes and steps of processes or methods performed by the incoming property offer notification system are described by reference to example systems that conceptually illustrate components of the systems which carry out one or more steps of methods or processes performed in relation to the incoming property offer notification system.

Embodiments of the real estate transaction facilitating process and system described in this specification differ from and improve upon currently existing options. In particular, some embodiments provide an improvement in the real estate industry because it allows for easy presenting since all offers are in one convenient location. Sellers and buyers are assured their offers are shown and seen. In addition, these embodiments improve upon the currently existing options in the real estate industry because it allows for easy presenting since all offers are in one convenient location. Sellers and buyers are assured their offers are shown and seen. This vastly improves transparency over the existing state of the industry, in which unethical agents are not doing their sellers justice by hiding offers. In the end, the seller may potentially receive less money for their home with the most qualified buyer missing out on the property and that buyer's agent missing out on their commission.

In contrast, the real estate transaction facilitating process and system of the present disclosure improves upon the existing options in the real estate industry by allowing buyers, sellers, and agents to see how many offers there are on a property. Sellers have access to all the offers that come in which eliminates a distrustful agent who may hid an offer. Buyers are assured the seller has seen their offer. Agents have all offers in one location so none can be misplaced.

The real estate transaction facilitating process and system of the present disclosure may be comprised of the following steps and elements. This list of possible constituent steps and elements is intended to be exemplary only and it is not intended that this list be used to limit the real estate transaction facilitating process and system of the present application to just these steps and elements. Persons having ordinary skill in the art relevant to the present disclosure may understand there to be equivalent steps and elements that may be substituted within the present disclosure without changing the essential function or operation of the real estate transaction facilitating process and system.

1. Buyer, seller, and agents sign up for website.
2. Listing agent sets up property on website and gets seller's permission to show the offer prices (or to hide the offer price).
3. Buyers and agents search and save properties they want to watch.
4. Buyers and agents get sent text and email notification(s) when an offer has been submitted on a property of their choice.
5. Sellers login and can see all the offers on their portal and get notified instantly when an offer has been submitted.
6. Buyer agents submit offers online through the site and are notified that their files have been uploaded.

By way of example, FIG. 1 conceptually illustrates a real estate transaction facilitating process 100. The real estate transaction facilitating process 100 may be implemented and performed by a real estate transaction facilitating software application. The real estate transaction facilitating software application may run on a server computing device to which other computing devices connect in order to interact with the real estate transaction facilitating software application. For example, the real estate transaction facilitating software application may run on a network-based cloud server to which mobile computing devices of buyers, agents, and sellers connect to facilitate real estate transactions. In this description, the steps of the real estate transaction facilitating process 100 are described by reference to FIGS. 2-7, which illustrate several graphical user interface (GUI) views that a visually output to display screens of mobile devices that allow buyers, agents, and sellers to interact over a network with the real estate transaction facilitating software application.

In some embodiments, the real estate transaction facilitating process 100 starts with sign up (at 110). Signing up (or registering) is a first step when a seller, an agent, and/or a buyer is not already signed up or registered. In some embodiments, each of the seller, the buyer, and the agent sign up (register) under a profile associated with the buyer, the seller, and/or the agent. Basic information is requested at sign up. Examples of information requested at sign up include, without limitation, a name, an email address, a password, a real estate transaction role designation, and a note field. The real estate transaction role designation can be a selection of seller, buyer, or agent. In some embodiments, agents can log in with an existing profile that is associated with a unique agent identifier. For example, agents can log in with a BRE# and the same contact information as buyer and seller.

An example of sign up is described by reference to FIG. 2, which conceptually illustrates an example registration view 200 of a GUI visually output on a display screen of a mobile device 210 to allow interaction with the real estate transaction facilitating software application running on the server computing device. As shown in this figure, the registration view 200 of the GUI includes fields for a user to input a name, an email address, and a password. The registration view 200 of the GUI also includes check boxes for the user to make a selection of a real estate transaction role, namely, a seller, a buyer, or an agent. A note field allows the user to input open-ended information related to ongoing the real estate transaction. To complete sign up, the user selects the "submit" button after inputting the requested sign up information. Submission is accepted when the requested sign up information is complete and correct. The sign up information is not correct when the input field expects input of a specific form or type, but the user-provided information does not satisfy the specific form or type. For example, the user tries to enter an email address without an "@" character, or the user leaves the name field empty or does not select a real estate transaction role. In some embodiments, the note field may be left empty, and is an optional field not required to be completed for acceptable submission of the sign up information. When the "submit" button is selected by the user, the information provided in the fields is checked for completeness and correctness. Submission is rejected when the requested sign up information is not completed correctly or is incomplete. The user can re-enter sign up information when the submission is rejected.

Turning back to FIG. 1, the real estate transaction facilitating process 100 of some embodiments proceeds to the next step at which listing agents submit a property online (at 120) and are notified when the submitted property has been added. To submit a property online, the user (e.g., an agent user) provides information including, without limitation, a name of the agent, an address of the property, an asking price of the property, a status of the property, and details about the property. In some embodiments, the information provided by the user need not be complete. For example, the user may input the agent name, the address of the property, and the status of the property, but may refrain from inputting an asking price or details about the property.

An example of property listing submission is described by reference to FIG. 3, which conceptually illustrates an example of a property listing view 300 of the GUI that is visually output on the display screen of the mobile device 210 of the user to allow a property to be submitted for listing at a portal of the real estate transaction facilitating software application running on the server computing device. As shown in this figure, the property listing view 300 of the GUI includes fields for the agent name, the property address, the asking price for the property, the status of the property, and details about the property. When the agent user has input information about the property to be listed, then the agent user may select the "submit" button to have the property posted and listed on the portal. Once submitted, the property can be found during a search of properties.

In reference to FIG. 1, the real estate transaction facilitating process 100 moves on to the next step at which buyers and agents are guided to the search page (at 130). Once at the search page, the buyer or the agent can select properties as favorites to be listed in private filtered list of favorite properties, or may simply review information pertaining to one or more properties they find interesting or worth keeping an eye on. At the search page, the user would also be able to search for and find any property submitted by way of the property listing view 300 of the GUI.

By way of example, FIG. 4 conceptually illustrates an example of a property search view 400 of the GUI that is visually output on the display screen of the mobile device 210 of the user to provide searching capabilities for the user to find listed properties. As shown in this figure, the property search view 400 of the GUI includes information fields of properties found during a property search, including, without limitation, an address for each listed property, details of each listed property, and a favorites designation. The property search view 400 of the GUI also includes a "Go To Favorites Page" button which, when selected by the user, navigates to a view of the favorites of the user. From the property search view 400 of the GUI, any one of the listed properties can be selected by the user. For example, the user may provide a touch input of the address information related to a particular listed property to see further details of the selected property. The user may also add properties to the user's own favorites by selection of the star adjacent to the corresponding listed property. Similarly, a selection of the star adjacent to a listed property which is already in the user's favorites will cause the property to be removed from the user's favorites list. As a person skilled in the art would appreciate, the GUI tools and fields shown in this example can take other forms. For example, the selectable star adjacent to each listed property can take a different form or shape, including a check box to designate the property as either a favorite or not, a selectable button to add the property to the favorites list, a selectable fill-in circle, etc.

Now turning back to FIG. 1, in some embodiments, the real estate transaction facilitating process 100 transitions to the next step at which the buyer and the agent(s) are notified (at 140) that an offer has been submitted in relation to a property which the buyer and/or the agent(s) have designated to watch (e.g., by adding the property to the buyer's list of favorites). In some embodiments, the buyer/agent notification is transmitted to the buyer and/or agent(s) via text message (SMS). In some embodiments, the buyer/agent notification is transmitted to the buyer and/or agent(s) via email. In some embodiments, the buyer/agent notification is transmitted to the buyer and/or agent(s) via mobile app, which when opened by the buyer and/or agent(s) is presented visually on the display screen of the device.

A typical buyer/agent notification is demonstrated and described next, by reference to FIG. 5. Specifically, FIG. 5 conceptually illustrates a buyer/agent notification 500 that is transmitted to and received by the buyer and/or the agent when an offer is submitted in relation to a particular listed property of interest to the buyer (and the agent). For example, the buyer may have searched for listed properties and added a particular listed property to the buyer's favorites list. When another party makes an offer in relation to the particular listed property, the buyer (and agent) are automatically notified as a result of the particular property being designated as a favorite of the buyer. As shown in this figure, the buyer/agent notification 500 is visually output on the display screen of the mobile device 210 used by either the buyer or the agent. As a person skilled in the art would appreciate, when the real estate transaction involves a buyer and one or more agents, each party (i.e., the buyer and each agent) would receive the same buyer/agent notification on their respective computing device, so long as the buyer has designated the property a favorite and is associated with the agent(s) in relation to the property. The buyer/agent notification 500 itself includes basic information that merely indicates that an offer has been submitted for a listed property which the buyer is in some way interested.

Turning back to FIG. 1, the real estate transaction facilitating process 100 of some embodiments continues forward to the next step at which a seller of a property is notified (at 150) when an offer has been submitted in relation to their property. In addition to being able to see the newly submitted offer for the property, the seller can view all offers on the property, in order to compare the newly submitted offer with any prior and/or pending offers related to the property. In some embodiments, the seller notification is transmitted to the seller via text message (SMS). In some embodiments, the seller notification is transmitted to the seller via email. In some embodiments, the seller notification is transmitted to the seller via mobile app, which when opened by the seller is presented visually on the display screen of the seller's computing device or mobile device.

A typical seller notification is demonstrated and described next, by reference to FIG. 6. Specifically, FIG. 6 conceptually illustrates an example of a seller notification 600 that is transmitted to and received at the mobile device 210 used by the seller when an offer has been submitted for a property associated with and listed by the seller. As shown in this example, the seller notification 600 includes basic information about the offer, including an offer price. The seller notification 600 also includes a button to "View Other Offers" which, when selected by the seller, navigates to a view that includes a list of all offers made in relation to the property, along with the offer price submitted with each offer. In this way, the seller is quickly informed of new offers on the property, and is able to efficiently compare all offers for the property by selection of the "View Other Offers" button.

Referring back to FIG. 1, in some embodiments, the real estate transaction facilitating process 100 transitions to a step at which an agent of a buyer submits an offer (at 160) in relation to a listed property. In some embodiments, the buyer provides some basic information in connection with the offer. Such basic information includes, without limitation, a name of the buyer or buyer's agent, a mobile number of the buyer or the buyer's agent, and/or an email address of the buyer of the buyer's agent. In addition to the basic information, in some embodiments, the buyer provides additional documents in connection with the offer. The additional documents may be suggested, recommended, or required. The additional documents in connection with the offer for the property include, without limitation, a formalized agreement, a written offer amount, a document related to financing or ability to pay the offer price by the buyer, among any of several other documents which may be connected to a real estate transaction for the property. A notification is transmitted to the seller when buyer makes the offer. Specifically, since the listed property is associated with a particular seller, it is the listed seller (or an agent of the seller) who is notified upon submission of the offer by the buyer and/or the buyer's agent (as described above at step 150). Therefore, as a person skilled in the art would appreciate, several of the steps of the real estate transaction facilitating process 100 may occur in a sequence that is alternative to the sequence of steps illustrated in FIG. 1, but the results of the real estate transaction facilitating process 100 will be the same.

A typical property offer is demonstrated and described next, by reference to FIG. 7. Specifically, FIG. 7 conceptually illustrates an example of a property offer submission view 700 of the GUI that is visually output on the display screen of the mobile device 210 of the buyer or an agent of the buyer. The property offer submission view 700 allows a buyer to make an offer for a listed property and to transmit the offer to the seller with additional required or suggested documents in support of the real estate transaction for the property. As shown in this figure, the property offer submission view 700 includes a name field for the name of the buyer or the name of the buyer's agent, an email field for the email address of the buyer or the email address of the buyer's agent, and a listing of documents required, recommended, or suggested to accompany the property offer submission. In this example, the list of documents includes an agreement (a formalized agreement), a document (a particular document with pertinent information), and a formalized offer statement. However, in some cases, there are no required, recommended, or suggested documents listed (even when formalized documents may later be required in support of an offer being submitted). Also, the property offer submission view 700 includes a "Submit" button which is selectable by the user (buyer or buyer's agent) to submit the offer to the associated seller of the property.

Turning back now to FIG. 1, in some embodiments, after completing some or all of the aforementioned steps, the real estate transaction facilitating process 100 ends. However, in some other embodiments, the real estate transaction facilitating process 100 is active on a continuous basis and is driven by user interactions related to one or more operations including signing up, listing properties, searching for properties, and making and receiving offers for properties.

The real estate transaction facilitating process and system of the present disclosure generally works by a website that runs a cloud service software application that implements the real estate transaction facilitating process. In some embodiments, the website is hosted by a cloud-network based web server computing device and is accessible to client computing devices that connect over the Internet. The cloud service software application may be implemented by encoding the steps of the process in a manner that a processing unit of the web server computing device can complete the operations as selected and directed according to a client computing device user's interaction with the cloud service. When the steps of the process are properly encoded, the user can navigate and interact to their desired end result. In some embodiments, the user follows the steps to guide the user through the online process to complete what they want to achieve.

By way of example, FIG. 8 conceptually illustrates a network architecture of a cloud-based real estate transaction facilitation and incoming property offer notification system 800. As shown in this figure, the cloud-based real estate transaction facilitation and incoming property offer notification system 800 includes several client-side computing devices, including a desktop computer 810, a first mobile computing device 820, a second mobile computing device 830, and a tablet computing device 840. The cloud-based real estate transaction facilitation and incoming property offer notification system 800 also includes a wireless communication point 842 (e.g., a cell tower for cellular data communication), a gateway 844, a set of front end cloud server computing devices 850 (for sign up and login by users of the client-side computing devices when connected to the web portal), a user database 852 (for buyer, agent, and seller profile/user information), a firewall 854, servers of third party document services 860, a set of real estate transaction facilitation and incoming property offer notification servers 870, a property listing database 880, a property offers database 885, and a notification of property offers database 890.

The client-side computing devices connect to the front end cloud server computing devices 850 over a public network ("cloud"), such as the Internet, in order to sign up or login to the cloud-based real estate transaction facilitation and incoming property offer notification system 800. After sign up and login, the client-side computing devices each open a session over a private cloud network to the set of real estate transaction facilitation and incoming property offer notification servers 870. Each of the client-side computing devices includes a graphical user interface (GUI)-based real estate transaction facilitation software application or GUI-based real estate transaction facilitation mobile app. The GUIs of the real estate transaction facilitation mobile app are like those described above by reference to FIGS. 2-7. The tablet computing device 840 connects to the wireless communication point 842 to connect (via the gateway 844) to the front end cloud server computing devices 850, which process connection requests from the client-side computing devices. Typically, the connection requests come with basic user information for sign up or, when already signed up, with user credentials for login. The login user credentials are checked for validity by a user authentication module of the front end cloud server computing devices 850 based on encrypted user credentials stored in the user database 852. The encrypted user credentials are stored in the user database 852 after sign up for each buyer, agent, and seller who uses the cloud-based real estate transaction facilitation and incoming property offer notification system 800 to facilitate a real estate transaction.

Upon valid authentication of the login user credentials, a session is started in relation to the client-side computing device of the user (the user being a buyer, an agent, or a seller), thereby allowing the user to access the set of real estate transaction facilitation and incoming property offer notification servers 870 over the private cloud network.

Also, the real estate transaction facilitation and incoming property offer notification servers 870 are line of business servers (LOB server computing devices) with at least a server-side real estate transaction facilitation and incoming property offer notification system software application and a database management system for storing data in and retrieving data from the property listing database 880, the property offers database 885, and the notification of property offers database 890. The real estate transaction facilitation and incoming property offer notification servers 870, the property listing database 880, the property offers database 885, and the notification of property offers database 890 are accessed over the private network connection for the client-side computing device session through a firewall 854 that secures data and system integrity for the real estate transaction facilitation and incoming property offer notification servers 870, the property listing database 880, the property offers database 885, and the notification of property offers database 890.

To make the real estate transaction facilitating process and the incoming property offer notification system of the present disclosure, one may code the software and then run the software on the networked server(s) to allow client-side computing devices to interact with the real estate transaction facilitation and incoming property offer notification system (or another platform that is accessible to the client computing device users, such as buyers, sellers, and agents). In some embodiments, the real estate transaction facilitation and incoming property offer notification system includes a front end graphical portal that is implemented as a website hosted on one or more of the front end cloud server computing devices 850. As such, the website may be deployed as a cloud service which includes development and deployment by a web developer or computer programmer.

To use the real estate transaction facilitating process and the incoming property offer notification system of the present disclosure, the user goes to the cloud-network web service (e.g., a website, such as AuthenticOffer.com which implements one or more embodiments of the real estate transaction facilitating process and system described in this specification) and follows the steps on the website to achieve a desired result. Seller to see the offers and get instant notification when an offer has been submitted. Buyers to see how many offers there are on a properties and to ensure the seller sees their offer. Buying agents to see how many offers are on a property for their clients and to submit offers online to the listing agent. Listing agent to have all offers in one place and to get notified on all offers that are submitted.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing or cursor control devices. The output devices 935 display images generated by the electronic system 900. The output devices 935 include printers and display devices, such as cathode ray tubes (CRT) or liquid crystal displays (LCD). Some embodiments include a touchscreen that functions as both an input and output device.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, facilitates real estate transactions, said program comprising sets of instructions for:

establishing a website portal to facilitate a real estate transaction;

setting up a particular property on the website portal by a listing agent;

determining whether the listing agent is permitted by a property seller of the particular property to show an offer price for the particular property on the website portal;

configuring the website portal to display the offer price for the particular property only when the property seller permits the listing agent to show the offer price and a disclaimer that hides the offer price for the particular property when the listing agent lacks permission from the property seller to show the offer price;

receiving, from a property searching user comprising one of a property buyer and an agent of the property buyer, search criteria to find any listed property matching the search criteria;

searching for listed properties that match the search criteria;

displaying, on a property search results page, property search results that include a particular property search result comprising the particular property on the website portal;

saving the particular property on the website portal in a private filtered property watch list of properties saved by the property searching user as favorite properties;

submitting a buyer offer for the particular property through the website portal by the agent of the property buyer;

submitting additional buyer offer documents in connection with the buyer offer for the particular property through the website portal by the agent of the property buyer, wherein the additional buyer offer documents comprise a formalized agreement, a written offer amount, and a document related to financing the purchase of particular property by the buyer;

notifying the property buyer and the agent of the property buyer of the buyer offer and the additional buyer offer documents after submission through the website portal is completed;

storing the submitted buyer offer and the additional buyer offer documents for the particular property in a property offers database;

notifying the property seller when the buyer offer is submitted for the particular property;

storing property seller notification information regarding notifying the property seller of the submitted buyer offer and the additional buyer offer documents in a notification of property offers database; and adding the submitted buyer offer for the particular property to a plurality of other buyer offers for the particular property listed on the website portal, wherein the submitted buyer offer and the plurality of other buyer offers are visually output for display when the property seller logs into the website portal to view the offers for the particular property, wherein details of the submitted buyer offer and the additional buyer offer documents are retrieved from the property offers database upon selection of the submitted buyer offer in the visually output display of offers for the particular property.

2. The non-transitory computer readable medium of claim 1, wherein the set of instructions for establishing a website portal comprises a set of instructions for receiving user information to sign up for the website portal by at least one of the property buyer, the property seller, and the agent of the property buyer.

3. The non-transitory computer readable medium of claim 1, wherein the property search results further include a second property search result comprising a matching second property that is different from the particular property on the website portal, wherein the program further comprises sets of instructions for:

saving the matching second property identified during the search in the private filtered property watch list associated with the property searching user; and sending a notification to the property buyer and the agent of the property buyer when an offer is submitted on the matching second property in the private filtered property watch list.

4. The non-transitory computer readable medium of claim 1, wherein the program further comprises a set of instructions for displaying all offers for the particular property on a seller website portal associated with a seller of the particular property when the property seller logs on to the seller website portal.

5. The non-transitory computer readable medium of claim 1, wherein the set of instructions for notifying the property seller when an offer is submitted for the particular property comprises a set of instructions for notifying the property seller by one of an email message and a text message.

6. A real estate transaction facilitation and incoming property offer notification system comprising:

a buyer computing device associated with a property buying user, said buyer computing device comprising software that visually outputs a graphical user interface for the property buyer user to search for, identify, and make offers on listed properties, wherein each listed property is configured to display one of an offer price for the property and a disclaimer that hides an offer price for the property based on whether a listing agent who set up the property as a listed property has received permission to show the offer price for the property;

a seller computing device associated with a property selling user, said seller computing device comprising software that visually outputs the graphical user interface for the property seller user to list a seller property for sale and to receive notifications of offers for the seller property, wherein the seller property for sale is configured to display one of an offer price for the seller property for sale and a disclaimer that hides the offer price for the seller property for sale based on whether the property selling user has received permission to show the offer price for the seller property for sale from a selling owner of the property;

a buyer agent computing device associated with a property buyer agent, said buyer agent computing device comprising software that visually outputs the graphical user interface for the property buyer agent to search for, identify, and make offers on listed properties in connection with preferences of the property buyer, wherein each listed property is configured to display one of an offer price for the property and a disclaimer that hides an offer price for the property based on whether a listing agent who set up the property as a listed property has received permission to show the offer price for the property, wherein the graphical user interface for the property buyer agent to make offers on listed properties includes an offer submission button to submit a buyer offer for the seller property and a documents tool to add additional buyer offer documents to the buyer offer for the seller property;

a front end cloud server computing device that performs user registration and login authentication for one or more of the property buyer user, the property seller user, and the property buyer agent; and a real estate transaction facilitation and incoming property offer notification server comprising a server processor and a software application, which when running on the server processor, establishes a session connection for each of the buyer computing device, the seller computing device, and the buyer agent computing device to allow the property buyer user, the property seller user, and the property buyer agent to interact with the real estate transaction facilitation and incoming property offer notification system to view listed properties, list properties as ready to receive offers, watch listed properties, and make offers on listed properties, wherein the real estate transaction facilitation and incoming property offer notification server configures an offer price display setting for each listed property, wherein the offer price display setting is based on whether the selling owner of the property permits the listing agent to display the offer price for the property, wherein the real estate transaction facilitation and incoming property offer notification server lists a particular buyer offer for the seller property upon receiving a selection of the offer submission button by the property buyer agent, wherein the real estate transaction facilitation and incoming property offer notification server sends an instant buyer notification to the property buying user and an instant seller notification to the property selling user upon receiving the particular buyer offer for the seller property.

7. The real estate transaction facilitation and incoming property offer notification system of claim 6 further comprising a user database that stores user sign up information and login credentials for each of the property buyer user, the property seller user, and the property buyer agent.

8. The real estate transaction facilitation and incoming property offer notification system of claim 6 further comprising a property listing database that stores information related to listed properties.

9. The real estate transaction facilitation and incoming property offer notification system of claim 8 further comprising a property offers database and a notification of property offers database, wherein the property offers database stores offers made by property buyers in connection with listed properties stored in the property listing database, wherein the notification of property offers database stores information for notifications sent to property sellers when offers are made in connection with listed properties associated with the property sellers and information for notifications sent to property buyers when offers are made in connection with listed properties the property buyers are watching.

* * * * *